United States Patent
Cosaro

(10) Patent No.: US 9,625,980 B2
(45) Date of Patent: Apr. 18, 2017

(54) LOW POWER CONFIGURATION FOR USB (UNIVERSAL SERIAL BUS) DEVICES

(71) Applicant: FREESCALE SEMICONDUCTOR, INC., Austin, TX (US)

(72) Inventor: Rob E. Cosaro, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 336 days.

(21) Appl. No.: 14/571,667

(22) Filed: Dec. 16, 2014

(65) Prior Publication Data

US 2016/0170472 A1 Jun. 16, 2016

(51) Int. Cl.
*G06F 1/32* (2006.01)
*G06F 13/24* (2006.01)
*G06F 9/44* (2006.01)

(52) U.S. Cl.
CPC .......... *G06F 1/3287* (2013.01); *G06F 1/3237* (2013.01); *G06F 13/24* (2013.01); *G06F 9/4418* (2013.01); *Y02B 60/1228* (2013.01)

(58) Field of Classification Search
CPC ........ G06F 1/32; G06F 1/3203; G06F 1/3234; G06F 1/3237; G06F 1/324; G06F 1/325; G06F 1/3287; G06F 9/4418; Y02B 60/1228
See application file for complete search history.

(56) References Cited

U.S. PATENT DOCUMENTS

| | | | | |
|---|---|---|---|---|
| 6,085,325 A | * | 7/2000 | Jackson | G06F 1/08 365/222 |
| 6,816,976 B2 | | 11/2004 | Wright et al. | |
| 7,415,626 B2 | * | 8/2008 | Lilja | G06F 1/3203 713/322 |
| 7,849,251 B2 | * | 12/2010 | Diefenbaugh | G06F 13/385 710/313 |
| 8,008,949 B1 | * | 8/2011 | Kallam | G06F 1/08 327/298 |
| 8,332,676 B2 | | 12/2012 | Lyra et al. | |
| 8,402,180 B2 | | 3/2013 | Fredriksen et al. | |
| 8,661,168 B2 | | 2/2014 | Wright et al. | |
| 9,342,131 B2 | * | 5/2016 | Saito | G06F 1/266 |
| 2005/0273637 A1 | * | 12/2005 | Lu | G06F 1/06 713/322 |
| 2006/0101186 A1 | * | 5/2006 | Lee | G06F 3/0227 710/313 |

(Continued)

FOREIGN PATENT DOCUMENTS

WO 2013019454 A1 2/2013

*Primary Examiner* — Thomas J Cleary

(57) ABSTRACT

The present disclosure provides for a method and semiconductor device for low power configuration. In one embodiment, a method includes receiving a packet from a host device, where the packet is received at a USB (Universal Serial Bus) device. The method also includes detecting, by the USB device, that the packet includes an endpoint address of a low power endpoint. The method also includes entering a low power mode state, in response to the detecting, where the USB device includes a USB clock domain that includes an internal reference clock (IRC) and clock recovery logic, and a clock tree block located outside of the USB clock domain. The entering the low power mode state includes disabling the clock tree block, and clocking the USB clock domain using the IRC and clock recovery logic.

20 Claims, 7 Drawing Sheets

(56) References Cited

U.S. PATENT DOCUMENTS

| | | | |
|---|---|---|---|
| 2010/0128888 A1* | 5/2010 | Junge | H04R 5/033 381/74 |
| 2012/0166826 A1* | 6/2012 | Flachs | G06F 13/36 713/310 |
| 2016/0269034 A1* | 9/2016 | Winemiller | H03L 7/0802 |

* cited by examiner

LOW POWER CONFIGURATION FOR USB (UNIVERSAL SERIAL BUS) DEVICES

BACKGROUND

Field

This disclosure relates generally to the USB (Universal Serial Bus) communication protocol, and more specifically, to implementing a low power configuration to reduce power consumption in USB devices.

Related Art

The USB (Universal Serial Bus) communication protocol standard supports data exchanges or transfers between devices, such as a host device and one or more peripheral devices. The USB standard defines different types of ports that are used by a connected peripheral device not only for data transfer, but also for charging capacity. A host device typically has one or more ports that have limited current capacity due to current limits imposed by the USB standard, as well as power limits imposed by the host's battery in real time. It is generally desirable for USB peripheral devices (e.g., USB devices without a separate dedicated power supply) to reduce power consumption when not in active use in order to avoid unnecessarily draining the host's battery.

BRIEF DESCRIPTION OF THE DRAWINGS

The present invention may be better understood, and its numerous objects, features, and advantages made apparent to those skilled in the art by referencing the accompanying drawings.

The present invention is illustrated by way of example and is not limited by the accompanying figures, in which like references indicate similar elements, unless otherwise noted. Elements in the figures are illustrated for simplicity and clarity and have not necessarily been drawn to scale.

DETAILED DESCRIPTION

Figure 1:
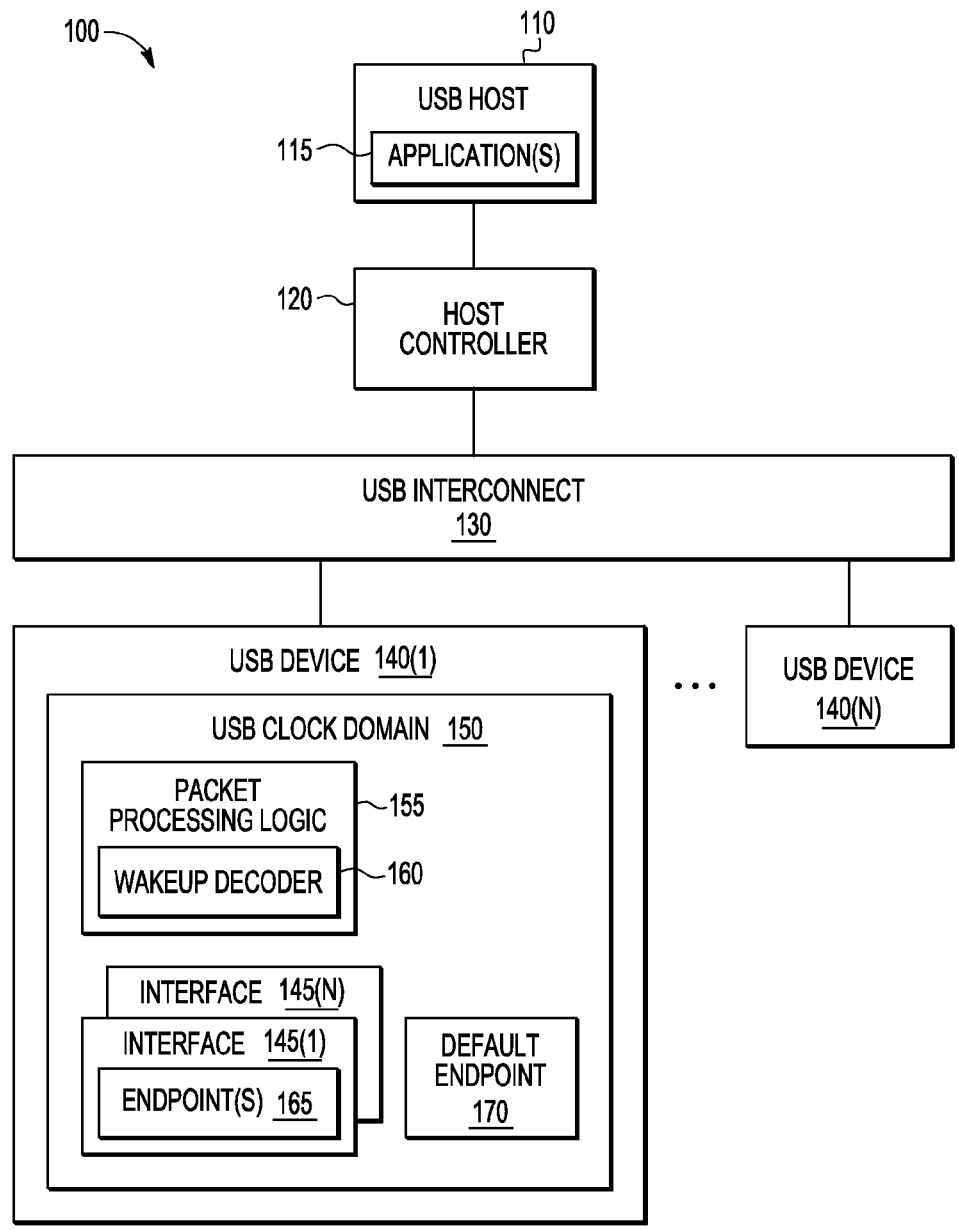
FIG. 1 illustrates a block diagram depicting an example system in which the present disclosure is implemented, according to some embodiments.

The following sets forth a detailed description of various embodiments intended to be illustrative of the invention and should not be taken to be limiting.

Overview

It is generally desirable for USB (Universal Serial Bus) devices to reduce power consumption when not in active use by a USB host device. To this end, the USB standard defines a USB suspend mode and a USB selective suspend mode in which a USB device must meet a particular current draw requirement, such as drawing no more than 0.5 mA (milliamps) or 2.5 mA (e.g., for high powered devices). However, as the computing power of USB devices increases, so does power consumption, making it difficult for such USB devices to successfully reduce power consumption to comply with the USB standard.

Further, both the USB suspend and USB selective suspend modes require that the USB device has been idle for some amount of time, which can negatively affect the application being used (e.g., audio applications). For example, resuming a USB device from USB suspend mode requires detection of an external resume or reset signal set by the USB host device for a relatively large idle time (e.g., signal is present on USB data lines for 20 ms (microseconds)). Further, once the USB device exits USB suspend or selective suspend mode, the USB device begins enumeration, which also takes another relatively large transition time (e.g., 10 ms) and increases overall delay.

Additionally, resuming a USB device from USB selective suspend mode uses a remote wakeup feature, where the USB device must be able to determine if external wakeup conditions exist (e.g., wakeup conditions generated externally to the USB device). In some cases, this may require an external interrupt to periodically and temporarily wakeup the USB device during the USB selective suspend mode in order for the USB device to check whether such wakeup conditions exist (e.g., whether a user event is detected, such as moving a mouse or pressing a key on a keyboard), which makes it difficult for the USB device to continue meeting strict USB current draw requirements during USB selective suspend mode.

Finally, the burden of implementing USB suspend and USB selective suspend modes is placed on the USB device vendor. Some USB device vendors may simply be unaware of the USB suspend or selective suspend mode commands (e.g., USB device vendors must know of the command to initiate the particular USB mode and explicitly indicate in a routine, such as a suspend routine, when the USB mode is initiated). Other USB device vendors simply do not allow their USB devices to enter USB suspend or selective suspend mode because the long delay times of such USB modes would be unacceptable for maintaining adequate availability for the user (e.g., health monitoring performed by a USB medical device). As such, these USB modes fail to provide an adequate power consumption solution for USB device vendors.

The present disclosure provides a low power configuration for USB devices that reduces power consumption of a USB device without requiring the USB device to enter USB suspend mode or USB selective suspend mode and without requiring special explicit USB commands or drivers to implement the present disclosure. The low power configuration for a USB device includes a separate USB clock domain partitioned from the rest of the USB device, where the USB clock domain includes packet processing logic that is configured to perform standard USB packet processing and the USB clock domain is always clocked. The low power configuration also includes a low power mode, which is entered into by the USB device based on an endpoint change detected during standard USB packet processing. USB communication protocol is not changed when the low power mode is not selected. For example, the USB device may still enter USB suspend or selective suspend mode if low power mode is not selected.

During the low power mode, the clocks outside of the USB clock domain are disabled and the rest of the USB device outside of the USB clock domain is powered down (e.g., the power supplied to the rest of the USB device outside of the USB clock domain is reduced or turned off), which reduces power consumption of the USB device. Also during the low power mode, the USB clock domain is clocked by an IRC (internal reference clock) using clock recovery to maintain accuracy. A phase locked loop (PLL) or external crystal is not needed during the low power mode, which also reduces power consumption of the USB device on which USB clock domain is implemented. In some embodiments, the USB clock domain receives a reduced voltage during the low power mode, further reducing power consumption of the USB device.

The packet processing logic of the USB clock domain is also configured to perform minimal USB packet processing during the low power mode. The packet processing logic of the USB clock domain also includes a wakeup decoder that is configured to generate an internal wakeup interrupt signal (e.g., generated internally to the USB device) based on whether a packet identifier (PID) of a USB packet received from USB host during minimal USB packet processing matches a wakeup PID, or a PID that is identified as a wakeup source for the USB device. The wakeup interrupt signal is configured to re-enable the clocks and to power up the rest of the USB device, as well as to exit the low power mode. Since the packet processing logic is configured to immediately generate a wakeup interrupt signal upon receipt of a wakeup PID, wakeup time of the USB device is reduced (e.g., avoids waiting for long idle times).

If a PID of a USB packet received during minimal packet processing does not match a wakeup PID, the packet processing logic is configured to respond to such packets with a negative acknowledgment (NAK), indicating that the USB device is presently unable to transfer data during the low power mode. The NAK also indicates to the USB host that USB device is still alive during the low power mode and should not be placed into a USB suspend or selective suspend mode by the USB host, which also increases availability of the USB device (e.g., avoids long transition times).

EXAMPLE EMBODIMENTS

FIG. 1 illustrates a block diagram depicting an example system 100 in which the present disclosure is implemented. System 100 includes a USB (Universal Serial Bus) host device 110, a host controller 120, a USB interconnect 130, and one or more USB peripheral devices 140(1)-(N). USB host device 110 and USB peripheral devices 140(1)-(N), also referred to as USB devices 140(1)-(N), are computing devices (e.g., a device with a processor and associated memory, such as a microcontroller that includes a semiconductor substrate) that implement USB communication protocol. USB peripheral devices also include peripheral hardware, such as a camera, speakers, microphone, user input devices such as buttons or keys, and the like. USB host device 110, also referred to as USB host 110, is communicatively coupled to host controller 120, which is a computing device configured to control traffic flow between USB host 110 and the one or more USB devices 140(1)-(N). USB host 110 and host controller 120 may be located on a single computing device or on separate computing devices. Examples of USB host device 110 include, but are not limited to, mobile phones, smartphones, computers, laptops, personal data accessories (PDAs), game consoles, automotive and other embedded systems, other wireless devices, and the like. Examples of USB peripheral devices 140 include, but are not limited to, modems, printers, scanners, video monitors, human interface devices (HID) such as keyboards, mice, game controllers, audio devices such as speakers, video devices such as video cameras and digital cameras, storage devices such as flash drives, other input/output (I/O) devices, and the like.

USB interconnect 130 is configured to provide a bi-directional communication path for transferring data between USB host 110 and USB devices 140(1)-(N), where host controller 120 and USB devices 140(1)-(N) are each communicatively coupled to USB interconnect 130 via a respective port. USB host 110 implements one or more client software applications 115 and each of USB devices 140(1)-(N) implements one or more features utilized by the client applications. Each USB device implements one or more interfaces 145(1)-(N) accessible by the client applications, where each interface provides a functional grouping of one or more endpoints 165 that perform a feature of the USB device.

An endpoint is a buffer for transferring data between the USB device and the USB host, where the endpoint is "opened" in response to a USB host's feature request. Each endpoint is associated with an endpoint address or identifier (ID) that is unique in system 100. USB host 110 may also switch from one endpoint to another endpoint on USB device 140 by sending a subsequent request associated with another endpoint, where USB device 140 is configured to detect the endpoint change. In response, USB device 140 closes the presently open endpoint, opens a different endpoint associated with the subsequent request, and responds to the request using the different endpoint (e.g., the USB device responds either by receiving data from USB host in the opened endpoint or by sending data to USB host from the opened endpoint). USB host requests are transmitted in USB packets, which are further discussed below in connection with FIG. 5.

Endpoints may be configured as control endpoints used for control requests like command and status operations, interrupt endpoints that store data for polling by the USB host, bulk endpoints that provide "bursty" transfer of data with error correction performed on the data being transferred, and isochronous endpoints that provide continuous transfer of data without error correction. Each of these endpoints utilize different amounts of bandwidth on USB interconnect 130 for transferring data between USB device 140 and USB host 110. Bandwidth-utilizing endpoints that are used by the client applications are also referred to as application endpoints. Each USB device also implements a default control endpoint 170 (also referred to as endpoint zero) that is used by USB host 110 for control requests (e.g., to obtain information about USB device 140, perform control and/or configuration operations).

In some embodiments, USB device 140 is also configured to implement at least one low power endpoint that reserves zero bandwidth on USB interconnect 130 for transferring data between USB host and USB device. A low power endpoint serves as a "standby" endpoint utilized by the client applications, where the USB device 140 does not receive data from or send data to USB host 110 when a low power endpoint is selected or open. It is noted that while low power endpoints are also utilized by the client applications, low power endpoints are distinguished herein from application endpoints due to the amount of bandwidth utilized by the two types (i.e., low power endpoints utilize zero bandwidth, while application endpoints utilize non-zero bandwidth). In some embodiments, endpoint zero (or the default control endpoint) is considered to be a low power endpoint, since the USB device is effectively in standby after acknowledging a USB host's control request that includes endpoint zero. In other embodiments, endpoint zero is distinguished from both a low power endpoint and an application endpoint since endpoint zero is utilized for control requests sent by USB host, and is not utilized by the client applications.

One or more USB devices 140(1)-(N) also include a USB clock domain 150 that is partitioned from the rest of USB device 140 on which USB clock domain 150 is located. USB clock domain 150 includes packet processing logic 155 configured to perform standard USB packet processing during USB modes per the USB standard and further configured to perform minimal USB packet processing during the low power mode. Packet processing logic 155 includes a wakeup decoder configured to detect whether a packet identifier (PID) of a received packet matches a wakeup PID, or a PID that is identified as a wakeup source for the USB device. USB device 140 enters a low power mode based on detecting an endpoint change to a low power endpoint, which is detected during standard USB packet processing. USB device 140 exits the low power mode based on detecting receipt of a wakeup PID, which is detected during minimal USB packet processing. USB clock domain 150 and its components are further discussed below in connection with FIG. 2.

Figure 5:
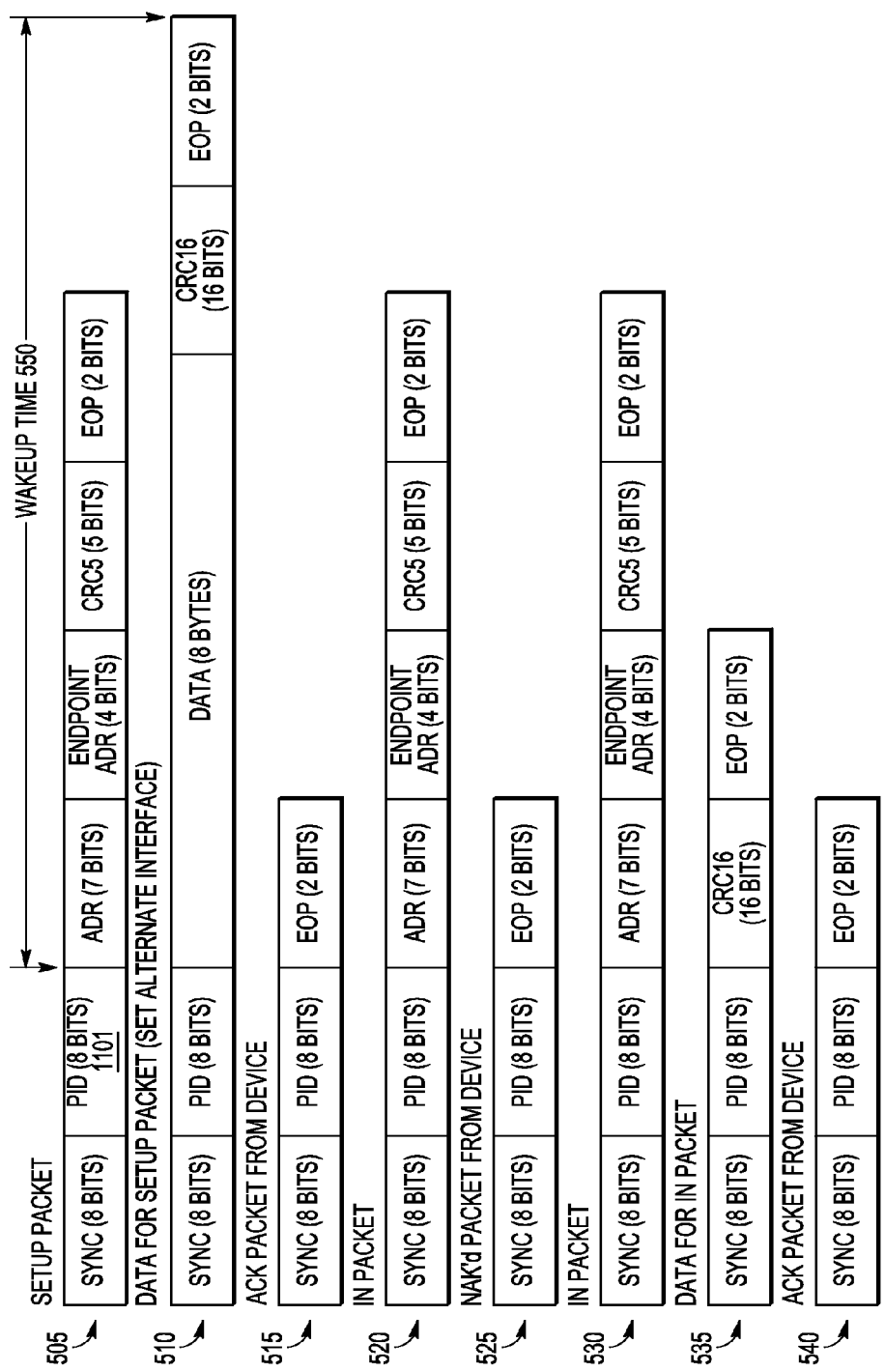
FIG. 5 illustrates a block diagram depicting example USB packets exchanged between a USB host device and a USB device, according to some embodiments.

FIG. 5 illustrates a block diagram depicting example USB packets 505-540 exchanged between a USB host and a USB device. In response to a request from the USB host, information is exchanged or transferred between the USB host and USB device using USB packets. A particular request from the USB host and the resulting response from the USB device form a transaction. Each USB packet includes a synchronization sequence (SYNC field) that synchronizes the clock of the USB device with the clock of the USB host. USB standard defines the SYNC field as eight bits (e.g., for low and full speed USB) or thirty-two bits long (e.g., for high speed USB). Each USB packet also includes an end-of-packet (EOP) field that indicates the end of the packet has been received. USB standard defines EOP field as two bits.

Each USB packet also includes a packet identifier (PID) field that defines the type of packet-specific information contained in the USB packet. USB standard defines the PID field as eight bits long, with the first four bits of PID field (or PID[3:0]) being the type field and the last four bits of PID field (or PID[4:7]) being the check field, where the check field is the binary reverse or complement of the type field. For example, a PID having a type field of 0101 also has a check field 1010. There are four types of packets, including TOKEN, DATA, HANDSHAKE, and SPECIAL, although additional PIDs and packet types may also be defined by USB standard.

A transaction is initiated by a TOKEN packet sent by the USB host to the USB device. There are four types of TOKEN packets, including start of frame (SOF), SETUP, OUT, and IN, although additional TOKEN packets may also be defined by the USB standard. The TOKEN packet indicates the transaction direction of the data (e.g., to/in or from/out the USB host) and the endpoint (e.g., control, interrupt, bulk, or isochronous) involved in the transaction. A PID of a TOKEN packet is also referred to herein as a TOKEN PID.

A transaction may also include one or more DATA packets that follow the token packet, where the DATA packets provide data to or from the USB host, according to the transaction direction. For example, a DATA packet following an IN packet contains data that is being transferred to the USB host from the USB device, while a DATA packet following an OUT packet contains data that is being transferred to the USB device from the USB host.

A transaction may also include a HANDSHAKE packet that follows the DATA packets (except for isochronous transactions, or transactions involving an isochronous endpoint), where the HANDSHAKE packet indicates whether the transaction is successful or has failed. HANDSHAKE packets are not used in isochronous transactions since time constraints make it difficult, if not impossible, to resend the data. Isochronous transactions are used to maintain a constant stream of data flowing in USB devices that can handle such data loss (e.g., audio and video devices).

Depending on the PID field, a USB packet may also include packet-specific information as defined by USB standard. A number of example PIDs are shown below in Table 1. For example, USB packet 505 (or a SETUP packet sent by USB host) includes a device address (ADR) field of seven bits that identifies the USB device, an endpoint address or identifier (ENDPOINT ADR) field of four bits that identifies an endpoint configured on the USB device, and a cyclic redundancy check (CRC) field used for error correction of the data included in the USB packet. USB standard defines TOKEN packets as having a five bit CRC (or CRC5), while DATA packets as having a sixteen bit CRC (or CRC16). USB packet 510 (or a DATA packet following SETUP packet 505 sent from USB host, which provides data indicated in the SETUP packet) includes eight bytes of data transferred to USB device and a CRC16 field. USB packet 515 (or an ACK packet sent from USB device that acknowledges the SETUP packet and DATA packet were successfully received) does not include any additional packet-specific information. USB packets 505-515 form one example transaction initiated by SETUP packet 505.

USB packets 520-525 form a second example transaction initiated by IN packet 520, where the USB device immediately responded with NAK packet 525 indicating to the USB host that the USB device is not ready to receive or process IN packet 520. USB packets 530-540 form a third example transaction initiated by IN packet 530, which is a subsequent attempt by USB host to send data to USB device after IN packet 520 failed. DATA packet 535 follows IN packet 530, and USB device responds with ACK packet 540 indicating that IN packet 530 and DATA packet 535 were successfully received.

TABLE 1

Example PIDs

| Packet type | PID Name | PID[3:0] |
| --- | --- | --- |
| TOKEN | SOF | 0101 |
|  | SETUP | 1101 |
|  | IN | 1001 |
|  | OUT | 0001 |
| DATA | DATA0 | 0011 |
|  | DATA1 | 1011 |
| HANDSHAKE | ACK | 0010 |
|  | NAK | 1010 |
|  | STALL | 1110 |
| SPECIAL | PRE | 1100 |
|  | SPLIT | 1000 |
|  | PING | 0100 |

Packet processing logic 155 is configured to decode received USB packets and extract information such as PID and endpoint address for use by the USB protocol. The present disclosure provides that a USB device enters a low power mode in response to receipt of a USB packet that includes an endpoint address of a low power endpoint. For example, USB device may enter low power mode in response to receipt of a TOKEN packet that includes an endpoint address of one of the low power endpoints configured on USB device.

Since TOKEN packets and some SPECIAL packets initiate transactions or are sent before initiating a transaction, a USB device that is in low power mode can use receipt of a TOKEN packet's PID or SPECIAL packet's PID to perform device wakeup and exit low power mode. For example, a SETUP PID may be identified as a wakeup PID, or a PID that is identified as a wakeup source for the USB device. When a USB packet is received by USB device, packet processing logic 155 decodes the PID of the received packet and immediately initiates device wakeup upon detecting that the PID of the received packet matches the wakeup PID, or SETUP PID. Since the USB host expects USB device to perform proper processing on any subsequent DATA packets following the SETUP packet, it is preferred that USB device completes device wakeup in time to process a following DATA packet (e.g., by the time the EOP of the DATA packet is received), which is especially beneficial in isochronous transactions where lost or dropped data is not resent. Wakeup time 550 is the time measured from when a PID of a SETUP packet is received by the USB device until the time that the EOP of a following DATA packet is received. An example wakeup time 550 is on the order of 10 microseconds. If the USB device has not completed device wakeup within wakeup time 550 and is not ready to process packets, the USB device may alternatively send a NAK packet to delay receipt of subsequent packets, which may be better tolerated in bulk and interrupt transactions rather than isochronous transactions.

If the PID of a received packet does not match the wakeup PID during low power mode, packet processing logic 155 responds to the packet with a NAK packet, indicating to USB host that USB device is not ready to process packets. The NAK packet also prevents USB host from placing USB device into a USB suspend mode. Entering and exiting low power mode is further discussed below in connection with FIG. 4.

Figure 4:
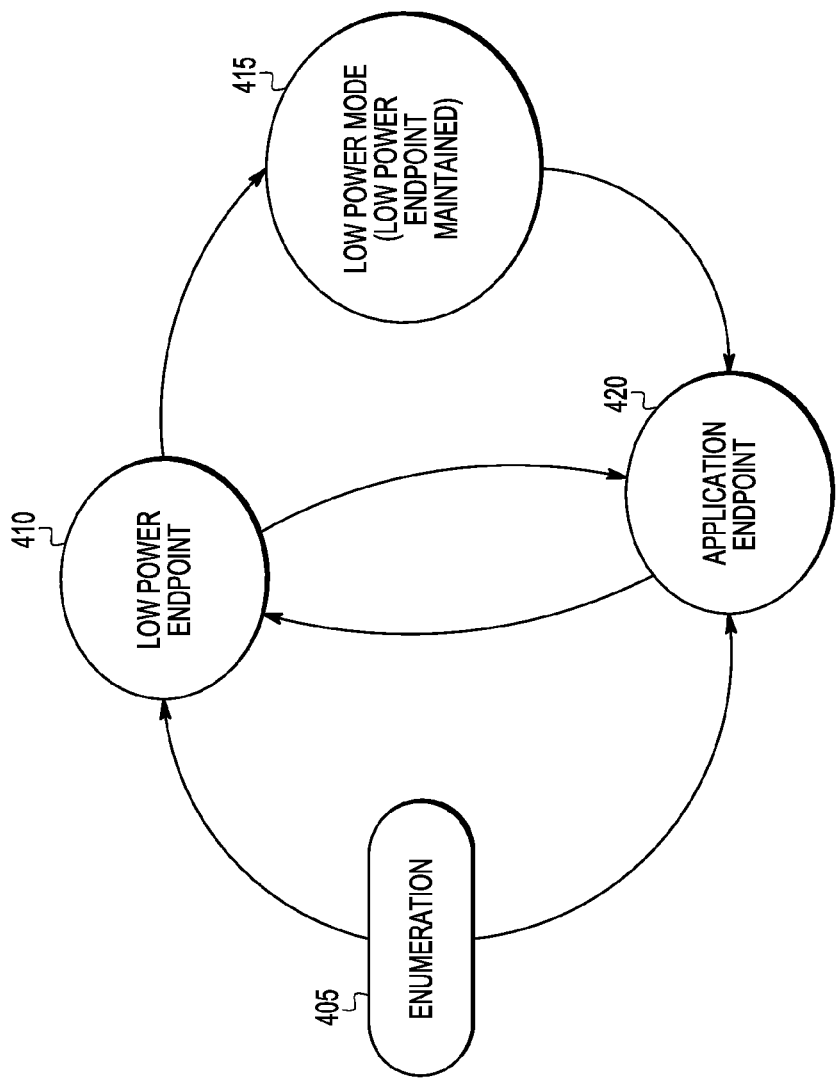
FIG. 4 illustrates a state diagram depicting example USB device operating states, according to some embodiments.

FIG. 4 illustrates a simplified state diagram depicting example USB device operating states according to the present disclosure, where packet processing logic 155 of USB device 140 generally enters and exits various operating states, including a low power mode state, based on the endpoint presently open on USB device 140. Packet processing logic 155 begins in an enumeration state 405 (e.g., on startup, after a reset, or resuming out of a USB suspend or selective suspend mode), during which initialization and configuration of the USB device is performed according to USB standard. Device configuration includes an indication of whether low power mode is an enabled option during operation of the USB device (e.g., setting a low power mode bit in a configuration register during enumeration), and if so, identification of the PIDs that will serve as wakeup sources during low power mode.

Once enumeration is complete, packet processing logic 155 either transitions to a low power endpoint state 410 in response to a low power endpoint being opened on USB device 140 (e.g., a TOKEN packet is received that includes an endpoint address of a low power endpoint), or transitions to an application endpoint state 420 in response to an application endpoint being opened on USB device 140 (e.g., a TOKEN packet is received that includes an endpoint address of an application endpoint). Packet processing logic 155 transitions from low power endpoint state 410 to application endpoint state 420, in response to an application endpoint being opened on USB device 140 (which closes the low power endpoint of low power endpoint state 410). Packet processing logic 155 also transitions from application endpoint state 420 to low power endpoint state 410 in response to a low power endpoint state being opened on USB device 140 (which closes the application endpoint of application endpoint state 420).

Once in low power endpoint state 410, packet processing logic 155 may remain in low power endpoint state 410 if low power mode is not enabled and is thus available to enter other USB states according to the USB standard implemented on the USB device. For example, packet processing logic 155 may transition to a USB suspend or selective suspend mode state (not shown) from low power endpoint 410 based on idle time.

From low power endpoint state 410, packet processing logic 155 has the option to transition to a low power mode state 415, during which the low power endpoint is maintained or continues to be open. During low power mode, the USB device outside of the USB clock domain 150 is powered down, clocks outside of the USB clock domain 150 are disabled, and/or a voltage provided to USB clock domain 150 is reduced. In response to an application endpoint being opened on USB device 140, packet processing logic 155 exits low power mode state 415 and transitions to application endpoint state 420, where the USB device outside of the USB clock domain 150 is powered up (e.g., device wakeup is performed).

Packet processing logic 155 decides whether to transition to the low power mode state 415 (e.g., enter low power mode) in response to predefined criteria being met, which criteria includes but is not limited to one or more endpoint addresses and idle time. For example, packet processing logic 155 may immediately transition to low power mode state 415 in response to any low power endpoint being opened (e.g., in response to receipt of a TOKEN packet that includes an endpoint address that matches any endpoint address of the low power endpoints configured on USB device 140), or in response to one of a number of particular low power endpoints being opened (e.g., in response to receipt of a TOKEN packet that includes an endpoint address that matches a particular endpoint address of a set of low power endpoints configured on USB device 140), or in response to a low power endpoint being opened that does not match a particular low power endpoint (e.g., in response to receipt of a TOKEN packet that includes an endpoint address that does not match a particular endpoint address of a low power endpoints configured to USB device 140).

Also, rather than immediately transitioning to low power mode state 415 in response to a low power endpoint being opened, packet processing logic 155 may alternatively transition to low power mode state 415 after some short idle time (if such criteria is so configured). It may be beneficial to wait in low power endpoint state 410 for receipt of a USB packet that indicates an application endpoint is being opened (and thus a direct transition to application endpoint state 420 from state 410 is achieved), rather than transition to low power mode state 415, power down the USB device, and perform device wakeup in response to the application endpoint being opened (or transitioning from state 410 to state 415 and then to application endpoint state 420). Powering down the USB device includes reducing power (e.g., providing a lower supply voltage level) or stopping power (e.g., providing substantially zero supply voltage) provided to the components of the USB device outside of the USB clock domain.

In some embodiments, it is preferred that powering down the USB device provides substantially zero supply voltage supplied to the components of the USB device outside of the USB clock domain, which turns off the components of the UBS device outside of the USB clock domain. In some embodiments, a power supply circuit (not shown) is implemented to control the amount of power provided to the components of the USB device outside of the USB clock domain (e.g., the power supply circuit turns off power or voltage supplied to the components during low power mode), as well as to control the amount of power provided to the USB clock domain (e.g., the power supply circuit provides a reduced power or voltage level to the USB clock domain during low power mode). Entry into and egress from low power mode state is further discussed below in connection with FIGS. 6 and 7.

Figure 2:
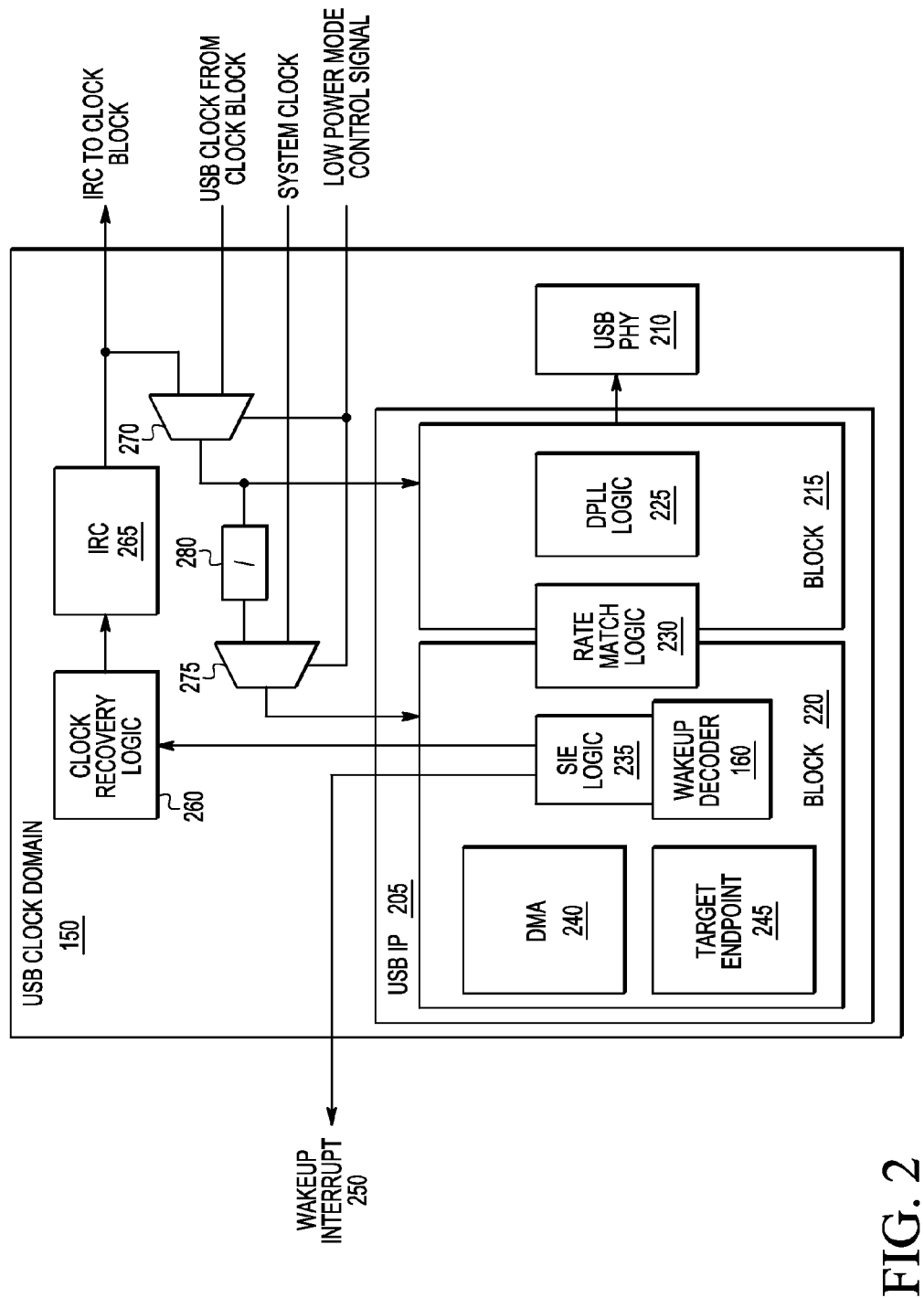
FIG. 2 illustrates a block diagram depicting an example USB clock domain in which the present disclosure is implemented, according to some embodiments.

FIG. 2 illustrates a block diagram depicting an example USB clock domain 150 in which the present disclosure is implemented. USB clock domain 150 includes USB Intellectual Property (IP) block 205, USB physical (PHY) block 210, and clock logic circuitry illustrated in the upper portion of USB clock domain 150. These components are implemented, at least in part, as circuitry on a semiconductor substrate. USB IP block 205 is an example embodiment of packet processing logic 155 that is configured to receive, process, and transmit USB packets according to the USB communication protocol standard. USB PHY block 210 is configured to communicate with components of USB device 140 that are located outside of USB clock domain 150, such as peripheral hardware on USB device 140. Clock logic circuitry is configured to generate clock signals that are used to clock USB clock domain 150 during various USB modes, including the disclosed low power mode. Although not shown, USB clock domain 150 also includes a USB device stack, which is software configured to manage device operations by communicating with the various components of USB device 140 (e.g., USB IP block 205, USB PHY block 210, and peripheral hardware on USB device 140). These components are further discussed below.

USB IP block 205 includes two portions or blocks of circuitry that operate at different speeds or frequencies. Block 215 of USB IP block 205 operates (or is clocked) using a clock signal having a fast frequency, also referred to as a fast clock signal (e.g., 48 MHz), while block 220 of USB IP block 205 is clocked using a clock signal having a slower frequency, also referred to as a slow clock signal (e.g., 12 MHz). USB IP block 205 also includes rate match logic 230 configured to ensure synchronized communication between blocks 215 and 220. The clock signals for blocks 215 and 220 are further discussed below in connection with clock logic circuitry.

Block 220 includes serial interface engine (SIE) logic 235, direct memory access (DMA) controller 240, and target endpoint 245. SIE logic 235 is configured to receive a packet from USB host 110 via USB interconnect 130 and decode data of the received packet, based on information in the packet. SIE logic 235 is also configured to open a target (or destination) endpoint 245 that is identified by an endpoint address in the packet and direct decoded packet data to target endpoint 245. Target endpoint 245 is one of a number of endpoints or buffers configured on USB device 140, including application endpoints and low power endpoints (which, in some embodiments, includes endpoint zero). SIE logic 235 is also configured to transmit data from target endpoint 245 to USB host 110 via USB interconnect 130.

SIE logic 235 is further configured to direct information (e.g., decoded packet data) to various components on the USB device 140, such as to direct memory access (DMA) controller 240 or to peripheral hardware outside of USB clock domain 150 via block 215 and USB PHY 210. DMA controller 240 configured to provide access to memory on USB device 140 when requested by USB host 110. DMA controller 240 may also be configured to communicate with advanced high performance bus (AHB) adapter logic and advanced peripheral bus (APB) adapter logic (not shown) to access memory on USB device 140, which are located outside of USB IP block 205 on USB device 140. Block 215 includes digital phase-locked loop (DPLL) logic 225 configured to lock an output signal with a clock signal received at block 215. The output signal includes information for peripheral hardware on USB device 140 located outside of USB clock domain 150 (e.g., commands to power down or power up), which are communicated to the component via USB PHY 210.

SIE logic 235 is also configured to enter low power mode based on detecting a target endpoint change from an application endpoint to a low power endpoint, such as by detecting when a received packet includes an endpoint address of a low power endpoint that is different from the endpoint address of the presently-open application endpoint. The detection of the low power endpoint change also switches the USB clock domain 150 to operate using IRC, as further discussed below. SIE logic 235 is also configured to enable wakeup decoder 160 when entering low power mode, such as by setting one or more enable disable bits, as further discussed below.

When entering low power mode, SIE logic 235 is also configured to notify USB device stack to disable the clocks outside of USB clock domain 150 (also referred to as a clock block) and to power down (e.g., turn off) the rest of the USB device 140 when entering low power mode. In some embodiments, SIE logic 235 also notifies USB device stack to shift the power supply voltage provided to USB clock domain 150 to a reduced voltage when entering low power mode. SIE logic 235 may notify USB device stack by setting one or more bits associated with a clock block disable operation, a power down operation, and/or a voltage reduction operation. USB device stack detects that the bit(s) are set and in response, performs the clock block disable operation, power down operation, and/or voltage reduction operation (which in some embodiments are part of a single operation). USB device stack also communicates clock block disable instructions, power down instructions, and voltage reduction instructions to relevant components of USB device 140 via USB PHY 210. Power down instructions may also include instructions to store state of the peripheral hardware on USB device 140.

Once in low power mode, SIE logic 235 is configured to perform minimal USB packet processing on received packets, which includes wakeup decoder 160 determining whether a packet identifier (PID) of each received packet matches a wakeup PID. If the PID of a received packet does not match any wakeup PIDs, SIE logic 235 responds to the packet with a negative acknowledgement (NAK), indicating to the USB host 110 that USB device is presently unable to transfer data, but is still active. SIE logic 235 also drops the packet and does not perform standard USB packet processing during low power mode.

If the PID of a received packet does match a wakeup PID, wakeup decoder 160 is configured to generate a wakeup interrupt signal 250. The wakeup interrupt is detected by USB device stack, which is responsible for USB interrupt handling. In response to receipt of the wakeup interrupt, USB device stack performs a device wakeup routine to re-enable the clocks outside of USB clock domain 150, to power up the rest of USB device 140, and/or shift the power supply voltage provided to USB clock domain 150 to a non-reduced (e.g., normal) voltage level. USB device stack also communicates clock block enable instructions, power up instructions, and/or voltage instructions to relevant components of USB device 140 via USB PHY 210. Power up instructions may also include instructions to restore state of the peripheral hardware on USB device 140. SIE logic 235 also disables wakeup decoder 160, switches USB clock domain 150 to operate using the clock block, and exits low power mode to an application endpoint state, where SIE logic 235 is available for performing normal USB packet processing. Wakeup decoder 160 is further discussed below in connection with FIG. 3.

Clock logic circuitry provides a fast clock signal to block 215 and a slow clock signal to block 220 during the various USB modes implemented on USB device 140. Clock logic circuitry is configured to use a USB clock and a (slower) system clock when operating during standard USB modes, and is configured to use an IRC (internal reference clock) and a fractional version of IRC during the disclosed low power mode.

Although not shown, a clock block is present outside USB clock domain 150 on USB device 140. The clock block (also referred to as a clock tree block) is configured to produce a number of clock signals utilized by USB device 140, where the clock signals have different speeds (e.g., clock signals that have frequencies at a fraction of a source clock frequency). The clock block is configured to provide USB clock signal (which is a clock signal that meets USB requirements) and a system clock signal to USB clock domain 150, where the USB clock has a higher (or faster) frequency than the system clock signal.

Clock recovery logic 260 is active during low power mode, where clock recovery logic 260 "trims" IRC 265, eliminating the need for an external crystal or oscillator during low power mode and reducing power consumption of USB device 140 during low power mode. Clock recovery logic 260 is configured to monitor start-of-frame (SOF) packets that are sent by USB host 110 approximately every 1 ms. SIE logic 235 forwards SOF information to clock recovery logic 260 upon receipt of each SOF packet. Clock recovery logic 260 compares the actual time that the SOF from USB host 110 arrives to the expected SOF arrival time based on IRC 265. In one embodiment, an IRC of 48 MHz is implemented. Clock recovery logic 260 uses the delta time between the actual and expected SOF to update the IRC trim value, which automatically adjusts IRC 265 to match USB host 110's clock. The matching between the host clock and the internal clock source allows for correct USB device operation even through the nominal untuned accuracy of IRC 265 may not meet USB requirements.

Clock logic circuitry also includes two multiplexers (MUX) for selecting clock signals used to operate USB IP block 205. MUX 270 is configured to receive USB clock from clock block as one input and IRC 265 (as adjusted by clock recovery) as another input. MUX 270 also has an enable input that receives a low power mode control signal. MUX 270 is configured to select a fast clock signal for block 215 from between USB clock received from the clock block and IRC 265, based on the low power mode control signal provided by SIE logic 235. Low power mode control signal is set (e.g., logic high) when both the low power mode is enabled (e.g., a configuration bit set during enumeration) and an endpoint change to a low power endpoint is detected (e.g., a low power endpoint is presently open) by SIE logic. Low power mode control signal is cleared (e.g., logic low) when a wakeup PID is detected by wakeup decoder 160. When low power mode control signal is set (e.g., logic high), MUX 270 outputs IRC 265 as the fast clock signal to block 215. When low power mode control signal is cleared (e.g., logic low), MUX 270 outputs USB clock as the fast clock signal to block 215.

The fast clock signal selected by MUX 270 is passed through programmable fraction divider 280 for providing a slower clock signal to MUX 275 (e.g., reduces 48 MHz to 12 MHz). MUX 275 is configured to receive the clock output from divider 280 as one input and system clock as another input. MUX 275 also has an enable input that receives the low power mode control signal. MUX 275 is configured to select a slow clock signal for block 220 from between the clock output by divider 280 and the system clock, based on the low power mode control signal. When low power mode control signal is set (e.g., logic high), MUX 275 outputs the clock from divider 280 (e.g., a fraction of IRC 265). When low power mode control signal is cleared (e.g., logic low), MUX 275 outputs the system clock.

Figure 3:
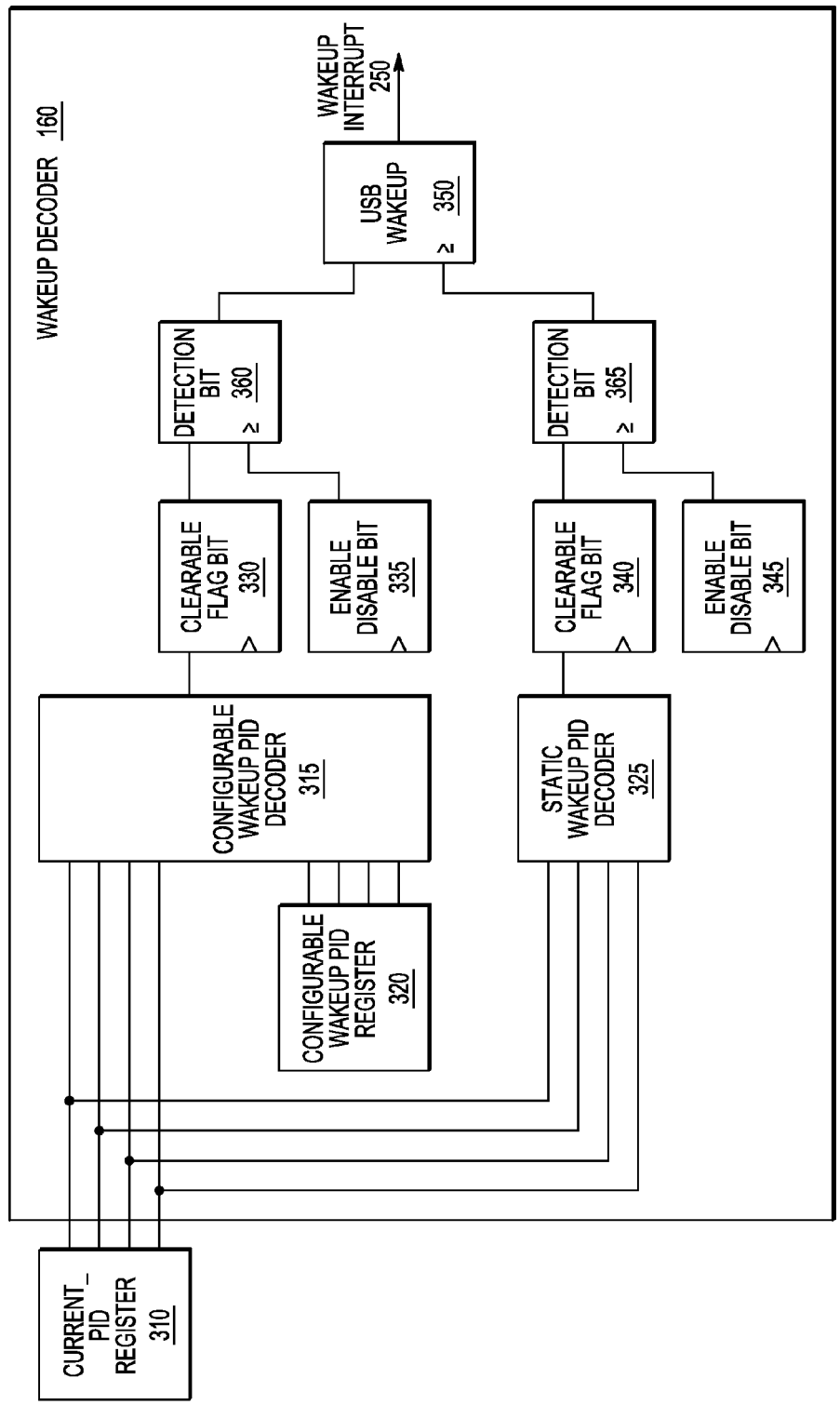
FIG. 3 illustrates a block diagram depicting an example wakeup decoder in which the present disclosure is implemented, according to some embodiments.

FIG. 3 illustrates a block diagram depicting an example wakeup decoder 160 in which the present disclosure is implemented. Wakeup decoder 160 is configured to determine whether a PID of a received packet matches a wakeup PID, which is a particular PID that has been identified as a wakeup PID. As noted above, since TOKEN packets and some SPECIAL packets initiate transactions or are sent before initiating a transaction, a USB device that is in low power mode can use receipt of a TOKEN PID or SPECIAL PID to perform device wakeup and exit low power mode. One or more PIDs are used as wakeup PIDs, or wakeup sources for the USB device. A wakeup PID is either a static wakeup PID or a configurable wakeup PID. A static wakeup PID is a pre-defined wakeup source and is either hard wired as part of a PID decoder or is stored in a register coupled to a PID decoder. A configurable wakeup PID is specified as a wakeup source during enumeration and is stored in a register coupled to a PID decoder. Examples of static wakeup PID and configurable wakeup PID include, but are not limited to, the TOKEN PIDs and SPECIAL PIDs listed in Table 1, as well as other PIDs defined by USB standard. Although the embodiment of wakeup decoder 160 that is illustrated in FIG. 3 implements a static wakeup PID and a configurable wakeup PID, other embodiments of wakeup decoder 160 may implement zero or more static wakeup PIDs and zero or more configurable wakeup PIDs, as further discussed below.

As illustrated in FIG. 3, current PID register 310 is coupled as an input to configurable wakeup PID decoder 315 and to static wakeup PID decoder 325 of wakeup decoder 160. Configurable wakeup PID register 320 is also coupled as an input to decoder 315. An output of decoder 315 is coupled to clearable flag bit 330 and an output of decoder 325 is coupled to clearable flag bit 340. Clearable flag bit 330 is coupled as an input to detection bit 360, and enable disable bit 335 is also coupled as an input to detection bit 360. Clearable flag bit 340 is coupled as an input to detection bit 365, and enable disable bit 345 is also coupled as an input to detection bit 365. Detection bits 360 and 365 are coupled as inputs to USB wakeup bit 350. Bits 330-345 may be stored in a register or other storage area or buffer. Bits 350-365 may be stored in a register or implemented as circuitry, as discussed below.

Current PID register 310 is configured to store a current PID that is extracted from a received USB packet by SIE logic. In some embodiments, register 310 is configured to store both the type and check portions of the current PID (e.g., eight bits), while in other embodiments, register 310 is configured to store the type portion of the current PID (e.g., first four bits, or PID[3:0]), since the check portion of the current PID is complementary to the type portion.

Configurable wakeup PID register 320 is configured to store a configurable wakeup PID, while static wakeup PID decoder 325 is configured to store a static wakeup PID (e.g., hard wired in static wakeup PID decoder 325). Configurable wakeup PID decoder, like decoder 315, is configured to determine whether the current PID stored in register 310 matches the configurable wakeup PID stored in a coupled register, such as register 320. Static wakeup PID decoder, like decoder 325, is configured to determine whether the current PID stored in register 310 matches the static wakeup PID stored or hardwired in the static wakeup PID decoder. In some embodiments, additional configurable wakeup PIDs are included in wakeup decoder 160 by implementing additional registers that store the configurable wakeup PIDs as part of a single configurable wakeup PID decoder, where the single decoder is configured to determine whether the current PID matches any of the configurable wakeup PIDs. In other embodiments, additional configurable wakeup PIDs are included by implementing a separate configurable wakeup PID decoder for each additional configurable wakeup PID. Similarly, in some embodiments, additional static wakeup PID decoders are included in wakeup decoder 160 by implementing the static wakeup PIDs in additional circuitry to a single static wakeup PID decoder, where the single decoder is configured to determine whether the current PID matches any of the static wakeup PIDs. In other embodiments, additional static wakeup PIDs included by implementing a separate static wakeup PID decoder for each additional static wakeup PID.

Clearable flag bits, such as bits 330 and 340, are configured to indicate whether a wakeup PID has been detected by a coupled decoder, such as decoders 315 and 325. Decoder 315 sets clearable flag bit 330 (e.g., logic high) when the current PID matches the configurable wakeup PID, and clears flag bit 330 (e.g., logic low) when the current PID does not match configurable wakeup PID. Similarly, decoder 325 sets clearable flag bit 340 (e.g., logic high) when the current PID matches the static wakeup PID, and clears flag bit 340 (e.g., logic low) when the current PID does not match the static wakeup PID. In embodiments where additional configurable or static wakeup PID decoders are included, each decoder is coupled to a single clearable flag bit that indicates whether a wakeup PID has been detected by that coupled decoder, even if that decoder performs detection for more than one wakeup PID.

Enable disable bits, such as bits 335 and 345, are configured to indicate whether an associated wakeup PID is used as a wakeup source during low power mode, and are set when USB device enters low power mode. Enable disable bit 335 is associated with the configurable wakeup PID stored in register 320 and enable disable bit 345 is associated with the static wakeup PID stored or hardwired in decoder 325. Enable disable bit 335 is set (e.g., logic high) by SIE logic when the USB device enters low power mode to indicate that the associated configurable wakeup PID is used as a wakeup source during low power mode, and is cleared (e.g., logic low) when the USB device exits low power mode. Enable disable bit 345 is set (e.g., logic high) by SIE logic when the USB device enters low power mode to indicate that the associated static wakeup PID is used as a wakeup source during low power mode, and is cleared (e.g., logic low) when the USB device exists low power mode. In some embodiments, an enable disable bit is cleared (e.g., logic low) when the USB device enters low power mode to indicate that the associated static or configured wakeup PID is not used as a wakeup source during lower power mode, as specified during enumeration.

Detection bits, such as bits 360 and 365, are configured to indicate whether an wakeup PID has been detected while USB device is in low power mode. A detection bit is set (e.g., logic high) when both the coupled clearable flag bit and enable disable bit are set (e.g., logic high), and is cleared (e.g., logic low) otherwise. In some embodiments, detection bit is implemented as a register having clearable flag bit as an input and enable disable bit as a register enable control signal, allowing the detection bit to store the value of clearable flag bit when enable disable bit is set (e.g., logic high), where the detection bit is otherwise cleared when enable disable bit is cleared (e.g., logic low). In other embodiments, detection bit is implemented as a logic function (e.g., AND gate) that outputs a set value (e.g., logic high) when both the coupled cleared flag bit and enable disable bit are set (e.g., logic high), and a cleared value (e.g., logic low) otherwise.

USB wakeup bit 350 is configured to immediately generate a wakeup interrupt signal 250 in response to any of the detection bits being set; in other words, upon detection of a wakeup PID being detected during low power mode. In some embodiments, USB wakeup bit is implemented using a logic function (e.g., an OR gate) that outputs an interrupt value (e.g., logic high) when either detection bit 360 and bit 365 is set (e.g., logic high), and outputs no interrupt value (e.g., logic low) otherwise. Wakeup interrupt signal 250 is detected by the USB device stack, which in response performs a device wakeup routine (e.g., to enable clocks that are outside of USB clock domain, power up the rest of the USB device outside of USB clock domain, and/or switch to a non-reduced voltage level provided to USB clock domain 150) and exits low power mode.

Figure 6:
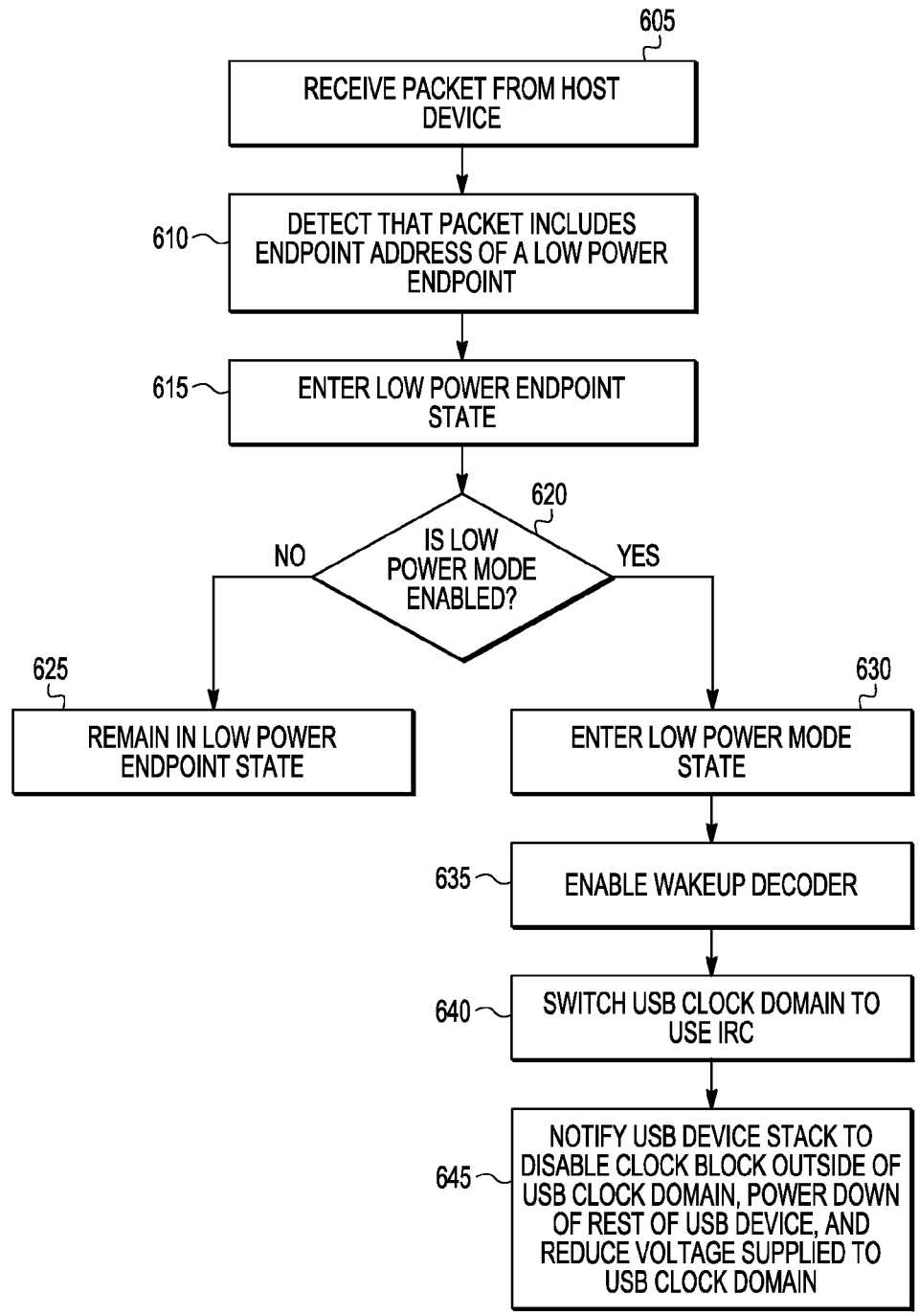
FIG. 6 illustrates a flowchart depicting an example process for entering a low power mode implemented by a USB device, according to some embodiments.

FIG. 6 illustrates a flowchart depicting an example process for entering a low power mode implemented by a USB device in which the present disclosure is implemented. The process illustrated in FIG. 6 is cooperatively implemented by packet processing logic, such as SIE logic, of the USB device, as discussed above in connection with FIG. 2.

The process begins at operation 605, where SIE logic receives a packet from USB host device, such as on a port of USB device coupled to USB interconnect, where the packet is routed internally to SIE logic. The process continues to operation 610, where SIE logic decodes the packet and detects that the received packet includes an endpoint address of a low power endpoint configured on USB device. The process continues to operation 615, where SIE logic enters low power endpoint state. The process continues to operation 620, where SIE logic determines whether low power mode is enabled, which is indicated by a configuration bit that is set (e.g., logic high) when the low power mode is enabled, and is cleared (e.g., logic low) when the low power mode is disabled on the USB device. During some embodiments of operation 620, SIE logic also determines whether criteria for entering low power mode state are met, as discussed above. If low power mode is not enabled (or the criteria, if any, are not met), the process continues to operation 625, where SIE logic remains in low power endpoint state, as specified by USB standard. The process then ends.

Returning to operation 620, if low power mode is enabled (and the criteria, if any, are met), the process continues to operation 630, where SIE logic enters low power mode state. The process continues to operation 635, where SIE logic enables the wakeup decoder, such as by setting wakeup decoder's enable disable bits for the wakeup PIDs that are desired to be used as wakeup sources during low power mode, as discussed above. The process continues to operation 640, where SIE logic switches USB clock domain to use IRC (as adjusted by clock recovery), as indicated by low power mode control signal being enabled (i.e., low power mode control signal is enabled in response to SIE logic detecting an endpoint change to a low power endpoint and the low power mode is enabled).

The process continues to operation 645, where SIE logic notifies USB device stack to disable the clock block, or clocks that are outside of USB clock domain, to power down the rest of the USB device outside of the USB clock domain, and to reduce voltage supplied to the USB clock domain. For example, SIE logic may notify USB device stack by setting a bit associated with a clock block disable operation, a power down operation, and a voltage reduction operation, which may be a single bit or may be one or more different bits. USB device stack is configured to detect the set bit(s) and, in response, perform the clock block disable operation, power down operation, and voltage reduction operation. Performance of these operations includes communicating instructions to relevant components outside of the USB clock domain via USB PHY and storing hardware state. The process then ends.

Figure 7:
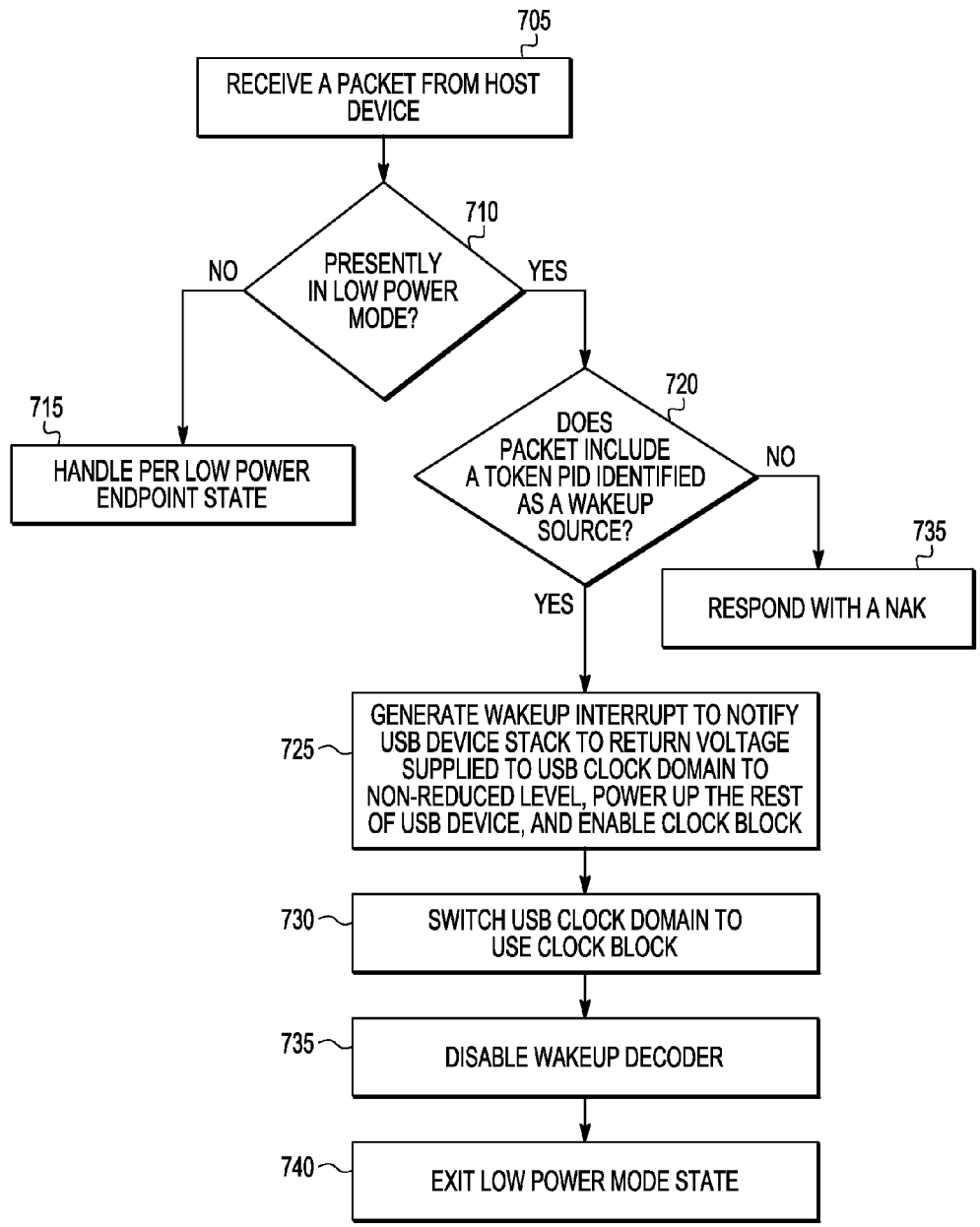
FIG. 7 illustrates a flowchart depicting an example process for exiting a low power mode implemented by a USB device, according to some embodiments.

FIG. 7 illustrates a flowchart depicting an example process for exiting a low power mode implemented by a USB device in which the present disclosure is implemented. The process illustrated in FIG. 7 is implemented by packet processing logic, such as SIE logic, of the USB device, as discussed above in connection with FIG. 2.

The process begins at operation 705, where SIE logic receives a packet from USB host device, such as on a port of USB device coupled to USB interconnect, where the packet is routed internally to SIE logic. The process continues to operation 710, where SIE logic determines whether SIE logic is presently in low power mode, such as by determining whether the low power mode control signal is enabled or set. The low power mode control signal is set (e.g., logic high) when the low power mode is enabled (e.g., a configuration bit corresponding to the low power mode is set) and an endpoint change to a low power endpoint has been detected. If SIE logic is not presently in low power mode, the process continues to operation 715, where SIE logic handles (e.g., decodes and processes) the packet per low power endpoint state, as specified by USB standard. The process then ends.

Returning to operation 710, if SIE logic is presently in low power mode, the process continues to operation 720, where SIE logic determines whether the received packet includes a token PID identified as a wakeup source. SIE logic includes a wakeup decoder configured to decode the packet and determine whether the packet PID matches one of the wakeup token PIDs. If the packet does not include a wakeup token PID, the process continues to operation 735, where SIE logic responds to the USB host with a NAK packet, such as by internally routing the NAK packet to a port of USB device coupled to USB interconnect for transmission to the USB host. The received packet is dropped and SIE logic continues to remain in low power mode state. The process then ends.

Returning to operation 720, if the packet does include a wakeup token PID, the process continues to operation 725, where SIE logic's wakeup decoder is configured to immediately generate a wakeup interrupt in response to the packet PID matching a wakeup token PID, where the wakeup interrupt is communicated to USB device stack. The wakeup interrupt notifies USB device stack to return the voltage supplied to the USB clock domain to a non-reduced level, power up the rest of the USB device outside of USB clock domain, and enable clock block. USB device stack also clears the bit(s) that were set in cleared in operations 645, 650, and 655 of FIG. 6. In response to receipt of the wakeup interrupt, USB device stack is configured to perform a clock block enable operation, power up operation, and voltage operation. Performance of these operations includes communicating instructions to relevant components outside of the USB clock domain via USB PHY and restoring hardware state.

The process continues to operation 730, where SIE logic switches USB clock domain to use (now enabled) clock block, as indicated by low power mode control signal being cleared (i.e., low power mode control signal is cleared in response to SIE logic detecting receipt of a wakeup PID). The process continues to operation 735, where SIE logic disables wakeup decoder, such as by clearing wakeup decoder's enable disable bits. The process continues to operation 740, where SIE logic exits low power mode state and returns to application endpoint state, where normal packet processing occurs as specified by USB standard. The process then ends.

By now it should be appreciated that there has been provided a low power configuration for a USB peripheral device that includes a partitioned USB clock domain and a low power mode of operation of the USB peripheral device, both of which achieve reduced power consumption by the USB peripheral device. In one embodiment of the present disclosure, a method is provided, which includes receiving a packet from a host device, where the packet is received at a USB (Universal Serial Bus) device. The method also includes detecting, by the USB device, that the packet includes an endpoint address of a low power endpoint, and entering a low power mode state, in response to the detecting. The USB device includes a USB clock domain that includes an internal reference clock (IRC) and clock recovery logic, and a clock tree block located outside of the USB clock domain. The entering the low power mode state includes disabling the clock tree block, and clocking the USB clock domain using the IRC and clock recovery logic.

One aspect of the above embodiment provides that the entering the low power mode state further includes powering down peripheral hardware on the USB device located outside of the USB clock domain.

Another aspect of the above embodiment provides that the method further includes, during the low power mode state, receiving a subsequent packet from the host device; and detecting whether the subsequent packet includes a packet identifier (PID) that matches a wakeup PID.

A further aspect of the above embodiment provides that the method further includes, in response to detection that the PID matches the wakeup PID, enabling the clock tree block and clocking the USB clock domain using the clock tree block.

Another further aspect of the above embodiment provides that the method further includes, in response to detection that the PID matches the wakeup PID, powering up peripheral hardware on the USB device located outside of the USB clock domain.

Another further aspect of the above embodiment provides that the method further includes, in response to detection that the PID does not match the wakeup PID, responding to the host device with a negative acknowledgement (NAK) packet.

Another further aspect of the above embodiment provides that the wakeup PID is one of a plurality of wakeup PIDs configured as wakeup sources for the USB device.

Another aspect of the above embodiment provides that the method further includes, during the low power mode state, maintaining the low power endpoint.

Another aspect of the above embodiment provides that the low power endpoint reserves zero bandwidth for data transfer on a USB interconnect between the USB device and the USB host.

Another aspect of the above embodiment provides that the low power endpoint is one of a plurality of low power endpoints configured on the USB device.

Another aspect of the above embodiment provides that the USB device enters the low power mode state further in response to criteria being met, and the criteria indicates that the USB device should enter low power mode state in response to receipt of the endpoint address of the low power endpoint.

Another aspect of the above embodiment provides that the criteria further indicates that the USB device should enter low power mode state after a period of idle time.

Another embodiment of the present disclosure provides for a semiconductor device including a clock tree block; peripheral hardware; and a USB (Universal Serial Bus) clock domain partitioned from the clock tree block and the peripheral hardware. The USB clock domain includes an internal reference clock (IRC) configured to output a clock signal, clock recovery logic configured to maintain accuracy of the clock signal, and packet processing logic. The packet processing logic is configured to receive a packet from a host device; enter a low power mode state, in response to detection that the packet includes an endpoint address of a low power endpoint, disable the clock tree block, and enable the IRC and clock recovery logic to clock the USB clock domain during the low power mode state.

One aspect of the above embodiment provides that the packet processing logic is further configured to power down the peripheral hardware on entry to the low power mode state.

Another aspect of the above embodiment provides that the packet processing logic is further configured to receive a subsequent packet from the host device during the low power mode state, and the packet processing logic comprises a wakeup decoder configured to detect whether the subsequent packet includes a packet identifier (PID) that matches a wakeup PID.

Another aspect of the above embodiment provides that the wakeup decoder is configured to output a wakeup interrupt signal in response to a detection that the PID matches the wakeup PID, and the wakeup interrupt signal is configured to trigger a wakeup interrupt routine that enables the clock tree block.

Another aspect of the above embodiment provides that the wakeup interrupt routine further powers up the peripheral hardware.

Another aspect of the above embodiment provides that the packet processing logic is configured to respond to the host device with a negative acknowledgement (NAK) packet in response to detection that the PID does not match the wakeup PID.

Another embodiment of the present disclosure provides for a semiconductor device including a USB (Universal Serial Bus) clock domain that includes an internal reference clock (IRC) configured to output a clock signal, clock recovery logic configured to maintain accuracy of the clock signal, and packet processing logic. The packet processing logic is configured to receive a packet from a host device; enter a low power mode state, in response to detection that the packet includes an endpoint address of a low power endpoint, and enable the IRC and clock recovery logic to clock the USB clock domain during the low power mode state.

One aspect of the above embodiment provides that the packet processing logic is further configured to receive a subsequent packet from the host device during the low power mode state, and the packet processing logic comprises a wakeup decoder configured to output a wakeup interrupt signal in response to a detection that a packet identifier (PID) matches a wakeup PID.

The semiconductor substrate described herein can be any semiconductor material or combinations of materials, such as gallium arsenide, silicon germanium, silicon-on-insulator (SOI), silicon, monocrystalline silicon, the like, and combinations of the above.

As used herein, the term "bus" or "interconnect" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the conductors of a bus or the bit locations of a value. For example, "bus 60 [7:0]" or "conductors [7:0] of bus 60" indicates the eight lower order conductors of bus 60, and "address bits [7:0]" or "ADDRESS [7:0]" indicates the eight lower order bits of an address value. The symbol "$" preceding a number indicates that the number is represented in its hexadecimal or base sixteen form. The symbol "%" preceding a number indicates that the number is represented in its binary or base two form.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system, such as for implementation of a protocol like USB protocol.

Some of the above embodiments, as applicable, may be implemented using a variety of different information processing systems. For example, although FIG. 1 and the discussion thereof describe an exemplary architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are circuitry located on a single integrated circuit or within a same device. Alternatively, system 100 may include any number of separate integrated circuits or separate devices interconnected with each other. Peripheral and I/O circuitry may also be located on separate integrated circuits or devices. Also for example, system 100 or portions thereof may be soft or code representations of physical circuitry or of logical representations convertible into physical circuitry. As such, system 100 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

System 100 may also include computer readable media, such as memory or other media on other computer systems, that may be permanently, removably or remotely coupled to system 100. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
   receiving a packet from a host device, wherein
     the packet is received at a USB (Universal Serial Bus) device;
   detecting, by the USB device, that the packet includes an endpoint address of a low power endpoint; and
   entering a low power mode state, in response to the detecting, wherein
     the USB device comprises
       a USB clock domain that includes an internal reference clock (IRC) and clock recovery logic, and
       a clock tree block located outside of the USB clock domain, and the entering the low power mode state comprises
disabling the clock tree block, and
clocking the USB clock domain using the IRC and
clock recovery logic.

2. The method of claim 1, wherein the entering the low power mode state further comprises:
powering down peripheral hardware on the USB device located outside of the USB clock domain.

3. The method of claim 1, further comprising:
during the low power mode state, receiving a subsequent packet from the host device; and
detecting whether the subsequent packet includes a packet identifier (PID) that matches a wakeup PID.

4. The method of claim 3, further comprising:
in response to detection that the PID matches the wakeup PID, enabling the clock tree block and clocking the USB clock domain using the clock tree block.

5. The method of claim 3, further comprising:
in response to detection that the PID matches the wakeup PID, powering up peripheral hardware on the USB device located outside of the USB clock domain.

6. The method of claim 3, further comprising:
in response to detection that the PID does not match the wakeup PID, responding to the host device with a negative acknowledgement (NAK) packet.

7. The method of claim 3, wherein
the wakeup PID is one of a plurality of wakeup PIDs configured as wakeup sources for the USB device.

8. The method of claim 1, further comprising:
during the low power mode state, maintaining the low power endpoint.

9. The method of claim 1, wherein
the low power endpoint reserves zero bandwidth for data transfer on a USB interconnect between the USB device and the USB host.

10. The method of claim 1, wherein
the low power endpoint is one of a plurality of low power endpoints configured on the USB device.

11. The method of claim 1, wherein
the USB device enters the low power mode state further in response to criteria being met, and
the criteria indicates that the USB device should enter low power mode state in response to receipt of the endpoint address of the low power endpoint.

12. The method of claim 11, wherein
the criteria further indicates that the USB device should enter low power mode state after a period of idle time.

13. A semiconductor device comprising:
a clock tree block;
peripheral hardware; and
a USB (Universal Serial Bus) clock domain partitioned from the clock tree block and the peripheral hardware, the USB clock domain comprising:
an internal reference clock (IRC) configured to output a clock signal,
clock recovery logic configured to maintain accuracy of the clock signal, and packet processing logic configured to
receive a packet from a host device;
enter a low power mode state, in response to detection that the packet includes an endpoint address of a low power endpoint,
disable the clock tree block, and
enable the IRC and clock recovery logic to clock the USB clock domain during the low power mode state.

14. The semiconductor device of claim 13, wherein the packet processing logic is further configured to
power down the peripheral hardware on entry to the low power mode state.

15. The semiconductor device of claim 13, wherein
the packet processing logic is further configured to
receive a subsequent packet from the host device during the low power mode state, and
the packet processing logic comprises a wakeup decoder configured to detect whether the subsequent packet includes a packet identifier (PID) that matches a wakeup PID.

16. The semiconductor device of claim 15, wherein
the wakeup decoder is configured to output a wakeup interrupt signal in response to a detection that the PID matches the wakeup PID, and
the wakeup interrupt signal is configured to trigger a wakeup interrupt routine that enables the clock tree block.

17. The semiconductor device of claim 16, wherein
the wakeup interrupt routine further powers up the peripheral hardware.

18. The semiconductor device of claim 15, wherein
the packet processing logic is configured to respond to the host device with a negative acknowledgement (NAK) packet in response to detection that the PID does not match the wakeup PID.

19. A semiconductor device comprising:
a USB (Universal Serial Bus) clock domain comprising:
an internal reference clock (IRC) configured to output a clock signal,
clock recovery logic configured to maintain accuracy of the clock signal, and
packet processing logic configured to
receive a packet from a host device;
enter a low power mode state, in response to detection that the packet includes an endpoint address of a low power endpoint, and
enable the IRC and clock recovery logic to clock the USB clock domain during the low power mode state.

20. The semiconductor device of claim 19, wherein
the packet processing logic is further configured to
receive a subsequent packet from the host device during the low power mode state, and
the packet processing logic comprises a wakeup decoder configured to output a wakeup interrupt signal in response to a detection that a packet identifier (PID) matches a wakeup PID.

* * * * *